March 10, 1964  W. F. TRAUGOTT  3,124,370
ADJUSTABLE PIVOTAL MOUNTING FOR WHEEL CONTROL ARM
Filed Feb. 6, 1961  2 Sheets-Sheet 1
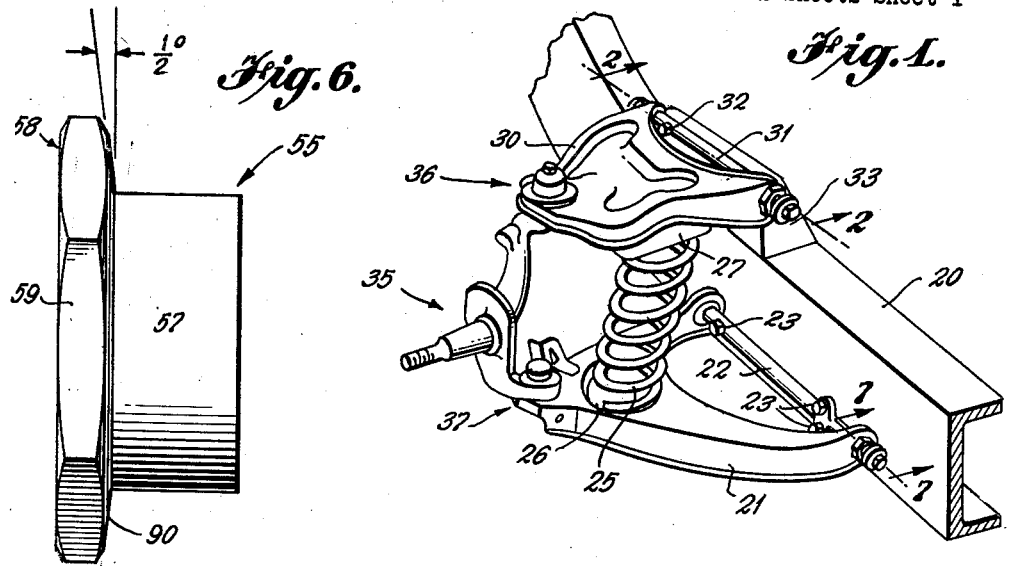
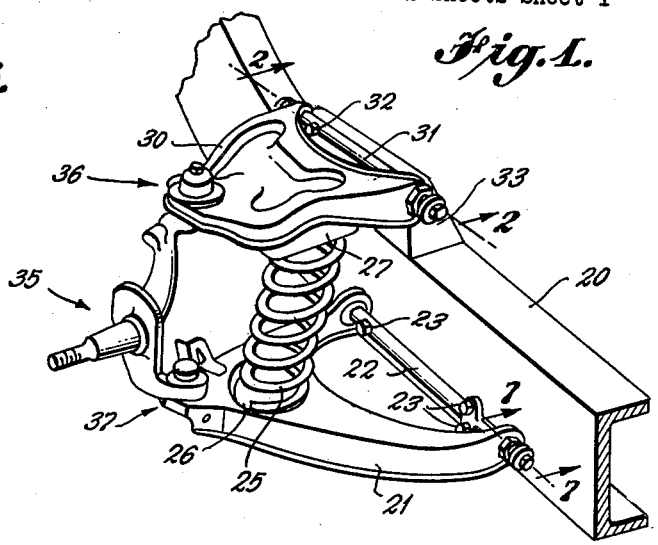
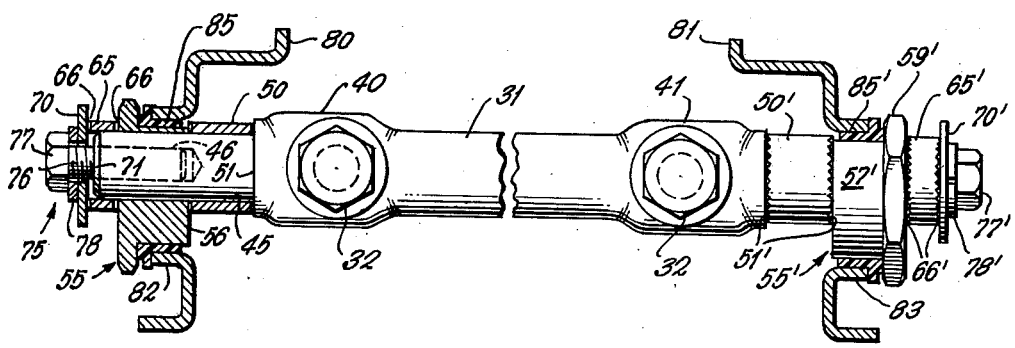
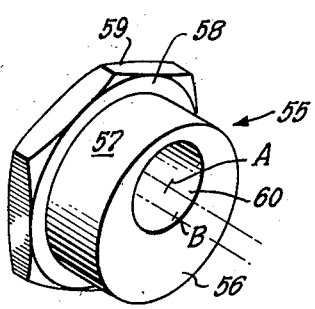
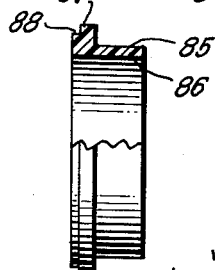
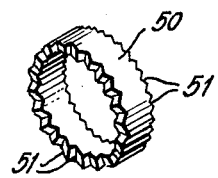
INVENTOR
WILFRED F. TRAUGOTT, DECEASED
BY BERTHA D. TRAUGOTT, EXECUTRIX
BY Shoemaker and Mattare
ATTORNEYS March 10, 1964 W. F. TRAUGOTT 3,124,370
ADJUSTABLE PIVOTAL MOUNTING FOR WHEEL CONTROL ARM
Filed Feb. 6, 1961 2 Sheets-Sheet 2
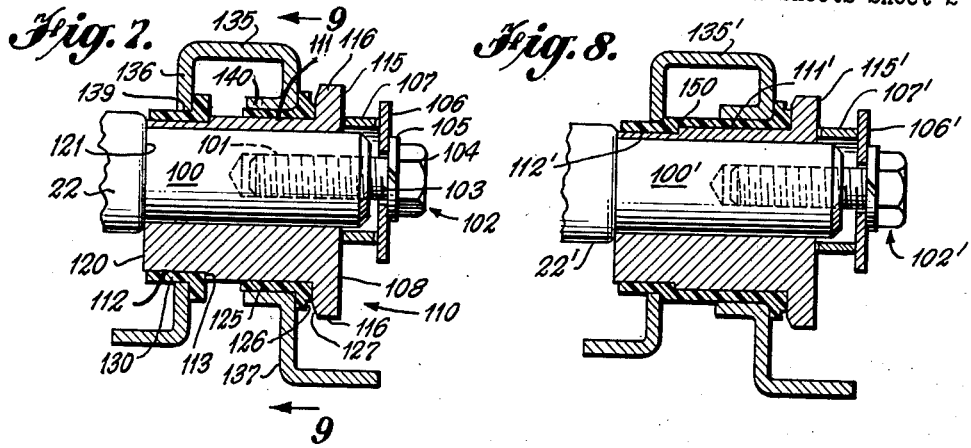
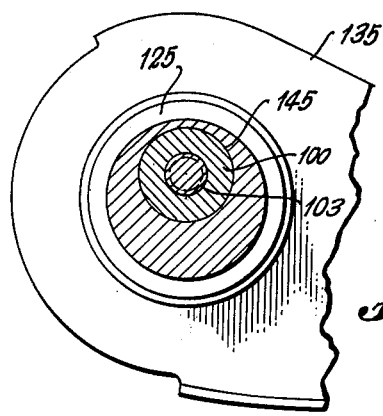
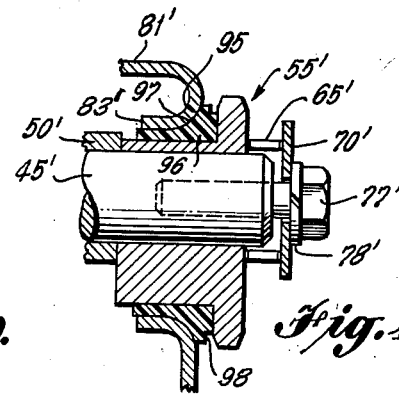
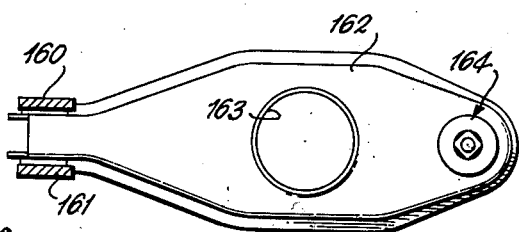
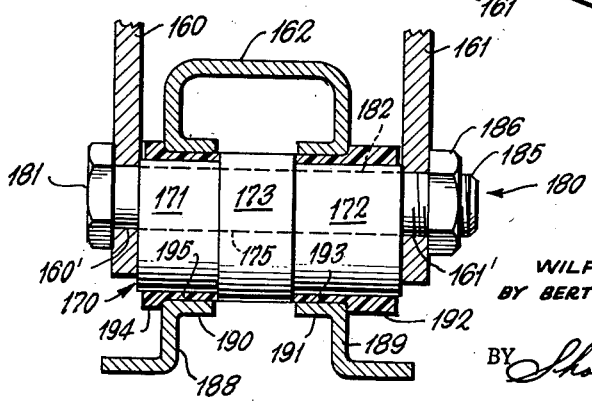
INVENTOR
WILFRED F. TRAUGOTT, DECEASED
BY BERTHA D. TRAUGOTT, EXECUTRIX
BY Shoemaker and Mattare
ATTORNEYS

# United States Patent Office 3,124,370
Patented Mar. 10, 1964

3,124,370
ADJUSTABLE PIVOTAL MOUNTING FOR WHEEL CONTROL ARM
Wilfred F. Traugott, Box 608, West Point, Va.; Bertha D. Traugott, executrix of the estate of said Wilfred F. Traugott, deceased
Filed Feb. 6, 1961, Ser. No. 87,189
8 Claims. (Cl. 280—96.2)

The present invention relates to a new and novel adjustable pivotal mounting, and more particularly to a mounting which is specifically adapted for adjusting the caster and camber of a vehicle front wheel in the front suspension assembly of an automotive vehicle.

The present invention is for use especially with automotive vehicles of the type wherein the front wheels are independently suspended from the vehicle frame, these types of assemblies generally employing upper and lower control arms, which are pivotally connected at their inner ends to the vehicle frame, the outer ends of the control arms supporting the wheel spindle assembly. These control arms project generally laterally from the vehicle frame and a coil spring is usually utilized and seated upon a portion of the frame and engaging one of the control arms whereby the associated wheel is sprung from the frame.

This construction is well-known in the art, and the caster and camber of the associated wheel are adjusted by shifting one end or the other of the wheel spindle either in a fore and aft or in and out direction as the case may be.

These adjustments are commonly effected by the utilization of shims which are placed behind the two mounting bolts of the inner pivot shafts which support the control arms. Shims are generally employed for this purpose in adjusting the camber.

The present invention represents an improvement over U.S. Patent 2,859,058 wherein an eccentric bushing is employed for ajusting the caster and camber. The eccentric bushing arrangement as shown in the aforementioned United States patent does in fact provide caster and camber adjustments, but the construction is disadvantageous from the standpoint that the eccentric bushing is locked to the control arm such that the caster and camber continually change upon pivotal movement of the control arm with respect to the associated pivot shaft and the frame of the vehicle. This is generally undesirable and it is a particular feature of the present invention to provide an arrangement wherein the adjusting bushing thereof is locked to the pivot shaft and the control arm rotates with respect to the adjusting bushing. With the arrangement of the present invention, the caster and camber adjustments may be made in a most simple and expeditious manner and yet at the same time the adjustment does not change upon pivotal movement of the control arms and once the adjustment has been made, the adjusting bushing may be fixedly locked in the desired operative position.

In the construction of the present invention, the adjusting bushing is provided with a cylindrical outer bearing surface upon which a rotatable bushing is journaled. This rotatable bushing is in turn received within an opening in the control arm such that the control arm is thereby effectively rotatably supported by the adjusting bushing.

The adjusting bushing itself is provided with a longitudinally extending bore formed therethrough, this bore being in eccentric relation to the cylindrical outer support surface formed thereon. A portion of an inner pivot shaft for an associated control arm of a conventional automotive vehicle extends through the bore in the bushing. The pivot shaft is suitably rigidly secured to the frame and the adjusting bushing may be locked to the pivot shaft through the intermediary of spacer means and a cap screw and pressure plate ararngement which is adapted to rigidly secure the adjusting bushing to the end portion of the pivot shaft.

An important feature of the present invention is the provision of means for reducing the squeaking noise which would otherwise occur between an enlarged radially extending portion formed on the adjusting bushing and the associated rotatable bushing which is in abutting relationship with one face of the enlarged portion of the adjusting bushing. In order to accomplish this desired reduction of noise, both the adjusting bushing and rotatable bushing are provided with a special construction.

The said one face of the adjusting bushing against which the rotatable bushing abuts is slightly tapered so as to provide a slightly frusto-conical outer surface. In addition, the outer peripheral edge portion of the rotatable bushing is relieved so as to form an annular groove adjacent the sloping face of the adjusting bushing. The intercooperation between the sloping face and the novel construction of the outer end portion of the rotatable bushing is such as to reduce any squeaking noise which may occur upon relative movement of the two bushings to a minimum.

A modified form of the invention is also disclosed for use with a modern type of car wherein the control arm is supported between a pair of frame members. In this particular modification, the adjusting bushing is of a modified construction such that a pair of spaced cylindrical outer surfaces are provided, an enlarged radially extending portion of the bushing being formed between these spaced cylindrical surfaces. Rotatable bushings are supported by the associated control arm, and each of the rotatable bushings is journaled upon one of the cylindrical outer surfaces formed on the adjusting bushing. Means is also provided for locking the adjusting bushing in fixed relationship to the frame members between which the adjusting bushing is mounted, while at the same time permitting relative rotation of the rotatable bushings with respect to the adjusting bushing.

An object of the present invention is to provide an adjustable pivotal mounting which permits camber and caster adjustments to be quickly and easily made in a vehicle suspension assembly.

Another object of the invention is the provision of an adjustable pivotal mounting including means to lock the pivotal mounting in operative position so that the camber and caster adjustment will not change while the apparatus is in use.

A further object of the invention is to provide an adjustable pivotal mounting which reduces to a minimum any squeaking noise which may be encountered during relative movement of the components thereof.

A still further object of the invention is to provide an adjustable pivotal mounting which is quite simple and inexpensive in construction, and yet which is quite efficient and reliable in operation.

Other objects and many attendant advantages of the invention will become more apparent when considered in connection with the specification and accompanying drawings, wherein:

FIG. 1 is a broken-away perspective view illustrating a front wheel vehicle suspension assembly with which the present invention is particularly adapted for use;

FIG. 2 is a sectional view taken substantially along line 2—2 of FIG. 1 looking in the direction of the arrows;

FIG. 3 is a perspective view of the adjusting bushing of the present invention;

FIG. 4 is a view partly broken away illustrating a rotatable bushing employed in the assembly shown in FIG. 2;

FIG. 5 is a perspective view of a spacer member employed in the assembly shown in FIG. 2;

FIG. 6 is an enlarged elevational view of the adjusting bushing particularly illustrating the frusto-conical construction of one face thereof;

FIG. 7 is a broken-away sectional view taken substantially along line 7—7 of FIG. 1 looking in the direction of the arrows;

FIG. 8 is a view similar to FIG. 7 illustrating a modified form of the present invention;

FIG. 9 is a sectional view taken along line 9—9 of FIG. 7 looking in the direction of the arrows;

FIG. 10 is a view illustrating an end assembly generally as shown in FIG. 2 of a slightly modified form of the invention;

FIG. 11 is a top plan view partly in section of a further form of the invention; and FIG. 12 is an enlarged, broken-away sectional view of the pivotal mounting means for the control arm assembly shown in FIG. 11.

Referring now to the drawings wherein like reference characters designate corresponding parts throughout the several views, there is shown in FIG. 1 a more or less conventional vehicle suspension assembly including a frame member 20 comprising a rigid channel member which may extend generally longitudinally of the vehicle. A conventional lower control arm 21 extends laterally outwardly of the frame member 20 and is pivotally supported by an inner pivot shaft 22 which is fixed to the frame member 20 by bolts 23.

A coil compression spring 25 is seated within a suitable well 26 provided in the lower control arm, the upper end of the coil spring being seated against an abutment 27 formed integral with the frame member 20.

A conventional upper control arm 30 is pivotally supported by an inner pivot shaft 31 which is connected by bolt means to an upstanding portion 33 fixed to the frame member 20.

A wheel spindle assembly indicated generally by reference numeral 35 is supported at the upper and lower portions thereof by ball joints indicated generally by reference numerals 36 and 37 mounted at the outer ends of the upper and lower control arms respectively. This is a conventional suspension arrangement associated with the front wheels of an independently sprung front wheel type vehicle.

The present invention relates to the adjustable pivotal mounting for varying caster and camber, and the invention arrangement may be incorporated in association with either or both of the lower and upper inner pivot shafts 22 and 31 respectively. The construction of the novel structure assocaited with the upper pivot shaft will be more fully understood from an inspection of FIGS. 2-6.

As seen particularly in FIG. 2, the upper control arm pivot shaft 31 includes a central portion which merges into enlarged portions 40 and 41 through which the bolts 32 extend, the bolts 32, of course, rigidly connecting the pivot shaft to the frame.

The structure mounted at each end of the pivot shaft is identical, and accordingly, a description of the structure employed at one end of the shaft is equally applicable to the structure at the opposite end of the shaft.

Referring especially to the lefthand portion of FIG. 2, it will be seen that shaft 31 is provided with an outer end portion 45 of reduced diameter as compared to the remainder of the shaft portion 31 which is cylindrical in configuration. An internally threaded opening 46 extends longitudinally of the shaft and opens through the outer end of the reduced portion 45 at each end of the shaft.

A first spacer member 50 is disposed in surrounding relationship to reduced end portion 45, and may fit relatively snugly about the end portion 45. It will be noted that one end of spacer 50 is abutted up against a shoulder 51 formed between the enlarged end portion of the shaft and the reduced end portion thereof.

Referring now to FIG. 5, the construction of spacer 50 is more clearly illustrated. As seen in this figure, spacer 50 comprises a ring-shaped member and is provided with serrations 51 formed along the opposite end edges thereof. These serrations are provided such that when the assembly is tightened into its operative position, the serrations will tend to dig into the adjacent components so as to prevent any relative rotation between the various components.

Referring back to FIG. 2, it will be seen that an adjusting bushing indicated generally by reference numeral 55 is also disposed in surrounding relationship to reduced end portion 45 of the shaft, one end face 56 of the adjustable bushing being abutted up against the outer end of spacer 50 when in the operative position as shown in FIG. 2.

Referring to FIG. 3, the construction of adjusting bushing 55 is more clearly illustrated and as seen in this figure, the adjusting bushing is provided with a cylindrical outer support surface 57 which is adapted to receive and support a rotatable bushing as hereinafter described. Also formed an adjusting bushing 55 is an enlarged radially extending portion 58 having flats 59 formed on the outer periphery thereof. The purpose of flats 59 is to permit adjustment and rotation of the adjusting bushing by means of a wrench or the like when the adjusting bushing is mounted in operative position as shown in FIG. 2.

Further referring to FIG. 3, a bore 60 extends longitudinally through the adjusting bushing and as clearly seen in FIG. 3, bore 60 is eccentric to the longitudinal axis of the cylindrical supporting surface 57. In other words, the center of bore 60 is indicated by letter A while the center of cylindrical surface 57 is indicated by letter B. With this arrangement, it will become apparent that rotation of adjusting bushing 55 about the associated pivot shaft will produce eccentric movement of the cylindrical surface 57 so as to suitably adjust the position of the supporting surface 57 to vary camber and caster as desired.

As seen in FIG. 2, the reduced portion 45 of the pivot shaft extends through and beyond the adjusting bushing 55. A second spacer member 65 is disposed in surrounding relationship to the outer end of reduced portion 45 of the pivot shaft, and spacer 65 may also be fitted relatively snugly about the outer end of the shaft. Spacer 65 is provided with serrations 66 along the opposite end edges thereof so as to prevent relative rotation between the components as discussed previously. It will be noted that the axial dimension of spacer 65 is such that the outer end edge of the spacer 65 is spaced outwardly beyond the terminal end of the reduced portion 45 of the pivot shaft.

A flat disc-like pressure plate 70 bears up against the outer end edge of spacer 65 and is provided with a central opening 71 therethrough. A cap screw 75 has a threaded shank portion 76 which is threaded within the threaded opening in the reduced end portion 45 of the pivot shaft. Cap screw 75 is provided with an enlarged head 77 which bears against a lock washer 78 which in turn bears up against the outer face of the pressure plate 70.

It is evident that upon advancing the cap screw 75 into the position shown in FIG. 2, the spacer members 50 and 65 and adjusting bushing 55 will all be compressed against one another so as to lock the adjusting bushing to the pivot shaft which is in turn fixed to the frame. Accordingly, when the cap screw is so advanced, the adjusting bushing is locked in any particular adjusted position. It is also evident that by loosening the cap screw 75, the adjusting bushing may be rotated to any new desired setting by engaging a wrench with the flats 59 formed on the adjusting bushing. The adjusting bushing can then be subsequently locked in operative position by advancing the cap screw into the threaded opening 46 in the pivot shaft. As pointed out previously, the arrangement at the opposite end of the pivot shaft is identical to that hereinafter described and the corresponding components have been given the same reference numeral primed.

As seen in FIG. 2, the upper control arm includes a first arm 80 and a second arm 81, these arms being provided with bosses 82 and 83 respectively. Rotatable bushings 85 and 85' of identical construction but in reverse relationship to one another are disposed within bosses 82 and 83 respectively. These rotatable bushings 85 and 85' are seated upon the cylindrical support surfaces 57 and 57' of the adjusting bushings at opposite ends of the pivot shaft. In this manner, the upper control arm is rotatably supported at opposite ends of the associated pivot shaft 31.

The construction of rotatable bushing 85 is more clearly illustrated in FIG. 4 wherein it will be seen that a bore 86 is formed therethrough which snugly fits upon the cylindrical support surface of the associated adjusting bushing. An annular radially extending flange 87 is formed at one end of the rotatable bushing, and an annular groove 88 is formed at the outer peripheral edge portion of the flange 87. The purpose of groove 88 will hereinafter appear.

The rotatable bushings are preferably formed of a substance such as nylon which has proved to be long-wearing in this type of installation, and at the same time is resistant to damage occurring from the impingement of oil, grease and water upon the rotatable bushing.

Referring now to FIG. 6, an enlarged view of the adjusting bushing 55 is illustrated, and as seen in this figure, the novel construction of the face 90 of the enlarged radial portion 58 adjacent to the cylindrical supporting surface 57 is illustrated. As indicated in FIG. 6, face 90 does not extend normally to the cylindrical support surface 57, but rather is slightly tapered so as to form a generally frusto-conical surface. The degree of taper is quite small, and as indicated in FIG. 6 may be on the order of ½°.

Referring back to FIG. 2, it will be noted that when the apparatus is in operative position, the end of each of the rotatable bushings having the radially extending flange formed thereon is abutted up against the face 90 of the associated adjusting bushing. This arrangement positively aligns the control arm with respect to the pivot shaft. During operation, there will, of course, be relative rotation of the rotatable bushing with respect to the adjusting bushings which are then locked in adjusted position.

It has been found that ordinarily, a considerable amount of squeaking noise is produced by rubbing of the rotatable bushing with respect to the adjusting bushing. By constructing the face 90 of the adjusting bushing with a slightly frusto-conical configuration, and by also forming the relieved portion on annular groove 85 in the adjacent face of the rotatable bushing, the amount of squeaking noise produced upon relative rotation of the adjustable bushings with respect to the rotatable bushings is reduced to a minimum.

Referring now to FIG. 10, a modification is illustrated wherein the components 50', 55', 65', 70', 77', and 78' are identical to those shown in FIG. 2, and are mounted upon the outer reduced end 45' of the pivot shaft.

In this modification, the boss 83' formed on the leg portion 81' of the associated control arm is formed with an arcuate surface 95. When the apparatus is employed with a control arm having a boss of this configuration, the associated rotatable bushing 96 is provided with a complementary curved outer surface 97 which fits snugly against the curved portion of the boss. This ensures proper seating of the boss upon the rotatable bushing. In this modification, the rotatable bushing 96 may also be provided with an annular groove 98 formed around the outer peripheral edge thereof for the same purpose as aforedescribed, namely that of reducing squeaking noise to a minimum.

Referring now to FIGS. 7 and 9 of the drawing, an arrangement is illustrated for supporting the lower control arm upon the lower pivot shaft 22. The lower pivot shaft is provided with a reduced end portion 100 having a threaded bore 101 formed at the outer end thereof and adapted to receive a threaded cap screw 102 therewithin, the cap screw having a threaded shank 103 and an enlarged head 104. The cap screw bears up against a lock washer 105 which in turn bears against a pressure plate 106 similar to the pressure plate 70 previously described. A spacer 107 is disposed between pressure plate 106 and the face 108 of the adjusting bushing 110 in this modification.

It will be noted that the adjusting bushing employed with the lower pivot shaft is of a slightly different construction than that previously described. Adjusting bushing 110 is provided with a first cylindrical outer bearing surface 111 and a second cylindrical outer bearing surface 112 of dissimilar diameter, the two surfaces defining an annular shoulder 113 therebetween.

An enlarged radially extending portion 115 is provided at the outer end portion of the adjusting bushing, and this enlarged portion 115 is also provided with flats 116 which are adapted to receive a wrench or the like for adjusting the position of the bushing.

It will be noted that the inner end portion 120 of the adjusting bushing is seated against a shoulder 121 defined between the reduced end portion 100 of pivot shaft 22 and the adjacent portion of the shaft. It is evident that the cap screw 102 is adapted to tighten up the spacer 107 against adjusting bushing 110 to lock the adjusting bushing in fixed relationship to the pivot shaft so as to prevent relative rotation therebetween, thereby locking the adjusting bushing in fixed position relative to the frame of the vehicle.

A first rotatable bushing 125 is provided and may be of substantially identical construction to the rotatable bushing 85 previously described. It will, of course, be understood that an annular groove 126 is provided in the outer peripheral edge of rotatable bushing 125 and cooperates with a slightly frusto-conical face 127 formed on the enlarged portion 115 of the adjusting bushing to reduce squeaking noise to a minimum.

A second rotatable bushing 130 is rotatably journaled on the cylindrical surface 112 of the adjusting bushing and is abutted up against the shoulder 113 of the adjusting bushing. As in the previous example, each of the rotatable bushings is preferably formed of nylon.

The lower control arm includes a pair of arms, one of which is indicated by reference numeral 135. Arm 135 is illustrated in FIG. 7, and as seen in cross section, this arm is substantially channel-shaped and includes depending spaced substantially parallel portions 136 and 137. An opening 139 is provided through portion 136 of the control arm, and bushing 130 fits snugly within opening 139. A boss 140 is formed in portion 137 of the control arm, and the rotatable bushing 125 is snugly received within boss 140. It is apparent that this arrangement serves to rotatably support the lower control arm on the outer end portion of pivot shaft 22. It will, of course, be understood that the identical arrangement is employed at the opposite end of the lower pivot shaft 22.

As seen particularly in FIG. 9, it will be noted that bore 145 which is formed through adjusting bushing 110, is eccentric with respect to the outer cylindrical surfaces 111 and 112 of the adjusting bushing, cylindrical surfaces 111 and 112 being concentric with one another. This eccentric arrangement permits adjustment of the positions of the supporting surfaces 111 and 112 as previously discussed.

Referring now to FIG. 8, a modification is shown which is quite, similar to FIG. 7, the similar components being given the same reference numerals primed. The only difference of the modification shown in FIG. 8 is the form of the rotatable bushing means. In this latter modification, the rotatable bushing indicated by reference numeral 150 is formed in one piece rather than being in two separate pieces as in the modification shown in FIGS. 7 and 9. Accordingly, the bushing 150 fits snugly about both cylindrical support surfaces 111' and 112' of the adjusting bushing and has the same relationship with the remaining components as the bushing employed in the modification shown in FIGS. 7 and 9.

Referring now to FIGS. 11 and 12 of the drawings, a still further modification of the invention is illustrated which may be employed with a construction presently utilized in modern compact American manufactured automobiles. In this particular construction, only camber adjustments may be made, and the arrangement substantially increases the facility with which such camber adjustments can be made. In this construction, a pair of depending frame members 160 and 161 are provided. As seen in plan view in FIG. 11, the control arm 162 extends substantially laterally outwardly from the depending frame members 160 and 161, and is provided with a well 163 for receiving a compression coil spring. A wheel spindle assembly may be supported at 164 in a relatively conventional manner.

Referring now more particularly to FIG. 12, an adjusting bushing 170 is provided. This adjusting bushing includes a pair of spaced cylindrical outer supporting surfaces 171 and 172 which are separated from one another by an intermediate portion 173 of slightly larger diameter than supporting surfaces 171 and 172.

A bore 175 extends through the adjusting bushing 170 and is eccentric to the cylindrical supporting surfaces 171 and 172 to provide substantially the same eccentric relationship as discussed in connection with the aforedescribed adjusting bushing.

It will be noted that the adjusting bushing 170 is of a length substantially equal to the distance between the inner facing walls of the depending frame members 160 and 161. The frame members are also provided with openings 160' and 161' which are aligned with the bore 175 formed in the adjusting bushing.

A bolt member 180 is provided with an enlarged head 181 and a shank portion 182 which fits snugly through the openings 160' and 161' in the frame members 160 and 161 respectively and through the aligned bore 175 formed in the adjusting bushing. The outer end portion 185 of the bolt is threaded, and a nut 186 is threaded therein. When the nut is drawn up on the bolt, the adjusting bushing 170 will be locked in the desired operative position. The control arm 162 includes a pair of depending portions 188 and 189 having bosses 190 and 191 formed therein respectively.

A first rotatable bushing 192 is rotatably journaled on cylindrical support surface 172 and includes a reduced diameter portion 193 snugly received within boss 191. A second rotatable bushing 194 is rotatable journaled on the cylindrical support surface 171 and includes a reduced diameter portion 195 which is received in boss 190. It is apparent that the structure shown in FIG. 12 provides a rotatable support for the control arm 162, and at the same time permits ready adjustment of the camber by loosening the nut 186 whereupon the adjusting bushing 170 can be rotated into the desired position whereupon the nut 186 may again be advanced to lock the adjusting bushing in operative position.

It is apparent from the foregoing that there is provided a new and novel adjustable pivot mounting particularly adapted for use in the front wheel vehicle suspension assembly and wherein camber and caster adjustments may be quickly and easily made. Means is provided for locking the pivotal mounting in operative position so that the camber and caster adjustment will not change during use of the apparatus, and a unique means is provided for reducing any squeaking noise to a minimum. The structure is quite simple and inexpensive in construction, and yet is quite efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. In a vehicle independently sprung front wheel assembly, a shaft for pivotally mounting the front wheel assembly, a control arm, means mounting the control arm upon said first shaft, said means including an adjusting bushing, said adjusting bushing having a cylindrical outer support surface and having a longitudinally extending bore formed therethrough eccentrically disposed with respect to said outer support surface, one end portion of said shaft extending through said bore, said shaft having a shoulder formed thereon spaced from said adjusting bushing, a first spacer means in surrounding relationship to the end portion of said shaft and being disposed between and engagement with said shoulder and one end portion of said adjusting bushing, a second spacer means in surrounding relationship to the outer end portion of said shaft and having one end thereof disposed in engagement with the opposite end portion of said adjusting bushing, and means adjustably mounted at the outer end of said shaft for engaging said second spacer means to urge the second spacer means toward said adjusting bushing so as to lock the adjusting bushing to said shaft and prevent relative rotation therebetween while permitting rotation of the control arm member with respect to the adjusting bushing.

2. Apparatus as defined in claim 1, said last-mentioned means including a cap screw threadedly mounted at the outer end of said shaft, said cap screw engaging a pressure plate which bears against the outer end of said second spacer means.

3. In combination with a vehicle frame, a pivot shaft secured to said frame, an adjusting bushing having a first cylindrical outer support surface formed thereon and having a longitudinally extending bore formed therethrough in eccentric relation to said outer support surface, one end portion of said shaft extending through said bore, said adjusting bushing also having a second cylindrical outer support surface formed thereon of less diameter than said first outer surface thereby defining an annular shoulder between said first and second outer surfaces, a control arm member having openings formed therein, and rotatable bushing means disposed within said openings, said rotatable bushing means being journaled on said first and second cylindrical surfaces of said adjusting bushing.

4. In combination with a pair of spaced vehicle frame members, an adjusting bushing positioned between said frame members, said adjusting bushing having a pair of spaced cylindrical outer surfaces formed thereon and an intermediate portion of enlarged diameter being formed between said spaced cylindrical surface portions, said adjusting bushing having a longitudinally extending bore formed therethrough in eccentric relationship to said outer cylindrical surface portions, a control arm member having a pair of spaced bosses formed therein, a rotatable bushing positioned within each of said spaced bosses, each of said rotatable bushings being journaled on one of said outer cylindrical surfaces, and means for locking said adjusting bushing in fixed relationship with respect to said frame members.

5. In combination with a vehicle frame, a pivot shaft secured to said frame, an adjusting bushing having a cylindrical outer surface formed thereon and having a longitudinally extending bore formed therethrough in eccentric relation to said cylindrical outer surface, one end portion of said pivot shaft extending through said bore, means mounted at the outer end of said shaft for rigidly locking said adjusting bushing to the end portion of said shaft and to prevent relative rotation therebetween, a rotatable bushing rotatably journaled on said cylindrical outer surface, a control arm member, said control arm member having a boss formed thereon, said rotatable bushing being received within said boss for rotatably mounting the control arm member on said adjusting bushing, said adjusting bushing including an enlarged radially extending portion, one end of said rotatable bushing being in abutting relationship with one face of the enlarged portion on said adjusting bushing, said one face of the enlarged portion of said adjusting bushing being substantially frusto-conical in configuration, said rotatable bushing having an annular groove at the outer peripheral edge portion thereof adjacent said one face of the adjusting bushing so as to assist in reducing the noise produced upon relative rotation of the adjusting bushing and the rotatable bushing.

6. In combination with a vehicle frame, a pivot shaft secured to said frame, an adjusting bushing having a cylindrical outer surface formed thereon and having a longitudinally extending bore formed therethrough in eccentric relation to said cylindrical outer surface, one end portion of said pivot shaft extending through said bore, means mounted at the outer end of said shaft for rigidly locking said adjusting bushing to the end portion of said shaft and to prevent relative rotation therebetween, a rotatable bushing rotatably journaled on said cylindrical outer surface, a control arm member, said control arm member having a boss formed thereon, said rotatable bushing being received within said boss for rotatably mounting the control arm member on said adjusting bushing, said adjusting bushing including an enlarged radially extending portion, one end of said rotatable bushing being in abutting relationship with one face of the enlarged portion on said adjusting bushing, the boss formed on said control arm member including a curved inner portion, the outer surface of said rotatable bushing having a complementary curved outer surface such that the outer surface of the rotatable bushing conforms to the inner surface of said boss, said rotatable bushing means comprising two separate spaced rotatable bushings, said adjusting bushing having an enlarged radially extending portion formed at the outer end thereof, one of said rotatable bushings abutting against said enlarged portion of the adjusting bushing and the other of said rotatable bushings abutting against the shoulder formed on said adjusting bushing.

7. An adjustable pivotal mounting including a pivot shaft adapted to be supported upon the frame of a vehicle, a control arm, means mounting the control arm upon said pivot shaft, said means including an adjusting bushing, said adjusting bushing having a cylindrical outer support surface formed thereon and having a longitudinally extending bore formed therethrough in eccentric relation to said outer cylindrical surface, a portion of said pivot shaft extending through said cylindrical bore, and means adjustably mounted at one end portion of the pivot shaft for locking the adjusting bushing in predetermined fixed relationship to said pivot shaft, while permitting rotation of the control arm member with respect to the adjusting bushing, said last-mentioned means including a spacer member surrounding the outer end of said shaft and extending beyond the end thereof, said spacer member being in engagement with said adjusting bushing, and cap screw means for urging said spacer means into the locked position.

8. In combination with a vehicle frame, a pivot shaft secured to said frame, an adjusting bushing having a cylindrical outer surface formed thereon and having a longitudinally extending bore formed therethrough in eccentric relation to said cylindrical outer surface, one end portion of said pivot shaft extending through said bore, means mounted at the outer end of said shaft for rigidly locking said adjusting bushing to the end portion of said shaft and to prevent relative rotation therebetween, a rotatable bushing rotatably journaled on said cylindrical outer surface, a control arm member, said control arm member having a boss formed thereon, said rotatable bushing being received within said boss for rotatably mounting the control arm member on said adjusting bushing, said adjusting bushing including an enlarged radially extending portion, one end of said rotatable bushing being in abutting relationship with one face of the enlarged portion on said adjusting bushing, said one face of the enlarged portion of said adjusting bushing being substantially frusto-conical in configuration whereby to reduce the noise produced upon relative rotation of the adjusting bushing with respect to the rotatable bushing.

References Cited in the file of this patent

UNITED STATES PATENTS

| | | |
|---|---|---|
| 1,044,055 | Johnson et al. | Nov. 12, 1912 |
| 2,238,879 | Dauben | Apr. 22, 1941 |
| 2,596,922 | Thoms | May 13, 1952 |
| 2,795,412 | Waisner | June 11, 1957 |
| 2,859,058 | Traugott | Nov. 4, 1958 |
| 2,890,893 | Laukhuff | June 16, 1959 |
| 2,973,213 | Moskovitz | Feb. 28, 1961 |